(12) United States Patent
Qin et al.

(10) Patent No.: US 7,506,244 B1
(45) Date of Patent: Mar. 17, 2009

(54) MODEL-DRIVEN SOFTWARE PUBLISHING SYSTEM AND METHOD

(75) Inventors: Johnson Jiahui Qin, Palo Alto, CA (US); Michelle Brent, Rocklin, CA (US); Shane Herman, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 10/360,462

(22) Filed: Feb. 7, 2003

(51) Int. Cl.
*G06F 17/00* (2006.01)

(52) U.S. Cl. .................. 715/229; 715/234; 717/168; 717/169; 717/170; 717/171; 717/172; 717/173

(58) Field of Classification Search ............... 715/513, 715/522, 501.1, 234, 229, 200; 717/168–173
See application file for complete search history.

(56) References Cited

U.S. PATENT DOCUMENTS

| | | | | |
|---|---|---|---|---|
| 5,933,823 | A * | 8/1999 | Cullen et al. ................ | 707/6 |
| 6,058,428 | A * | 5/2000 | Wang et al. ................ | 709/232 |
| 6,757,673 | B2 * | 6/2004 | Makus et al. ................ | 707/3 |
| 6,901,378 | B1 * | 5/2005 | Linker et al. ................ | 705/27 |
| 2002/0087476 | A1 * | 7/2002 | Salas et al. ................ | 705/59 |
| 2003/0090696 | A1 * | 5/2003 | Willis et al. ................ | 358/1.14 |
| 2003/0172135 | A1 * | 9/2003 | Bobick et al. ................ | 709/220 |
| 2003/0200459 | A1 * | 10/2003 | Seeman ................ | 713/200 |
| 2003/0208399 | A1 * | 11/2003 | Basak et al. ................ | 705/14 |
| 2004/0111327 | A1 * | 6/2004 | Kidd et al. ................ | 705/26 |

* cited by examiner

*Primary Examiner*—Stephen S Hong
*Assistant Examiner*—Adam M Queler
(74) *Attorney, Agent, or Firm*—Stolowitz Ford Cowger LLP

(57) ABSTRACT

The present invention facilitates a model driven, scalable and integrated software method for publishing digital information in a convenient, coordinated and proper manner. The present invention includes a workflow open model that offers flexibility for very complex software publishing business processes and scalability and extensibility for a variety of software publishing datamodels (e.g. via XML technology). The architecture and implementations enable many different software publishing data models to seamlessly work together. This model-driven software publishing system is compatible with open standard workflow models and extensible XML language. It can publish software images according to different software data management models including software user authentication and authorization models, software information models, software product models, software composite models, software entitlement models, etc. In one embodiment each model will be described as business workflow tasks and defined as different Extensible Markup Language Document Type Definition (XML DTD) metadata for software models.

21 Claims, 7 Drawing Sheets

MODEL-DRIVEN SOFTWARE PUBLISHING SYSTEM AND METHOD

FIELD OF THE INVENTION

This invention relates to the field of information publishing. In particular, the present invention relates to a model driven, scalable and integratable software publishing system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Systems providing these advantageous results often include digital information stored on a variety of mediums (e.g., software binary images, digital documents, digital music, digital video, etc.). This digital information is often published for a variety of reasons. However, traditional attempts at efficiently publishing the information are usually limited.

The creators of digital information often have a desire to publish the information. Owners of proprietary digital information often publish the information with the anticipation of generating a benefit (e.g., profits). Digital information is being developed at exponentially increasing rates and the speed at which a publisher can publish the information is also important. Efficient and convenient publishing mechanisms are very important for enabling of rapid publication of large amounts of information. In general, the greater the ease of publishing the information the greater the probability of increased widespread publication.

Publishing information properly often involves consideration of a wide variety of issues. Publication usually entails high level interactions to ensure the correct information is being published and managing the publication of proprietary digital information is often a very complicated and tedious endeavor. Providing a publication mechanism with a variety of characteristics (such as convenient user interaction, adequate protection, coordination with other publications, workflow control, etc.) is typically very difficult. Prior attempts at publication management usually lack desirable integration, automation and scalability features. Some traditional approaches to publication attempt to utilize computer applications to help manage the publication of proprietary information. There are a lot of different activities and database applications that can have a potential impact on publication and often make management very difficult. In the past, vast publication information from various sources was not typically integrated in a structured and coordinated manner. For example, requisite information that impacts publication is not typically integrated across different resources in traditional publication approaches making desirable convenient publication very difficult to realize.

Prior attempts at digital publishing management are usually limited. For example current software publishing attempts often find it difficult to perform "Software Image Publishing On Demand". Existing publishing mechanisms also typically have problems with duplicate image publishing. Some existing commercial publishing products may provide some measure of support for publishing static data files and binaries (e.g., "Web Content Management Software Products"). However, they usually have characteristics (e.g., a very complex software product hierarchy, complicated software image entitlement, etc.) that are typically difficult to integrate with. Traditional directory-based software publishing systems typically have difficulties managing file directory permissions and handling user entitlement and user authorizations, etc. Some existing software publishing systems also tend to have problems with multiple software image publishing, software CD publishing and software bundling publishing etc. Some existing software publishing systems tend to utilize file directory hierarchies with restrictions and limitations of software distribution and have issues supporting scalable database-driven software product hierarchy. For example, some existing non-web software publishing system use low-level command-line user interfaces with less productivity. There are a number of activities associated with publication that a system and method should integrate with such as software build/release, software bug and patch, etc.

What is required is a system and method that facilitates a scalable publication system and method capable of automated integration of information associated with various activities.

SUMMARY

The present invention facilitates a model driven, scalable and integrated software method for publishing digital information. The present system and method assists publication on a flexible and scalable basis with automated integration of information associated with various publication related concerns. The present invention enables convenient publication in a coordinated and proper manner. The present invention includes a workflow open model that offers a large degree of flexibility for very complex software publishing business processes. The present invention also offers scalability and extensibility for a variety of software publishing data models (e.g. via XML technology). The architecture and implementations enable many different software publishing data models to seamlessly work together to achieve maximum business benefits for software distribution. This model-driven software publishing system is compatible with open standard workflow models and extensible markup language (XML). It can publish software images according to different software data management models including software user authentication and authorization models, software information models, software product models, software composite models, software entitlement models, etc. In one embodiment each model will is described as business workflow tasks and defined as different Extensible Markup Language Document Type Definition (XML DTD) metadata for software models.

DETAILED DESCRIPTION

Reference will now be made in detail to the preferred embodiments of the invention, a model driven publishing system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a model-driven binary image (e.g., software, music, videos, etc.) publishing system and method that facilitates efficient and effective distribution. A present invention model-driven publishing system and method permits a flexible combination of a number of different characteristics and information associated with digital image publishing. For example, in one embodiment a present invention model-driven system and method enables automated coordination, correlation and creation of information that assists cost effective and convenient publication of digital information. The publication is based upon model-driven flexibility and extensibility in a manner that supports scalability and integration of the digital information.

Figure 1A:
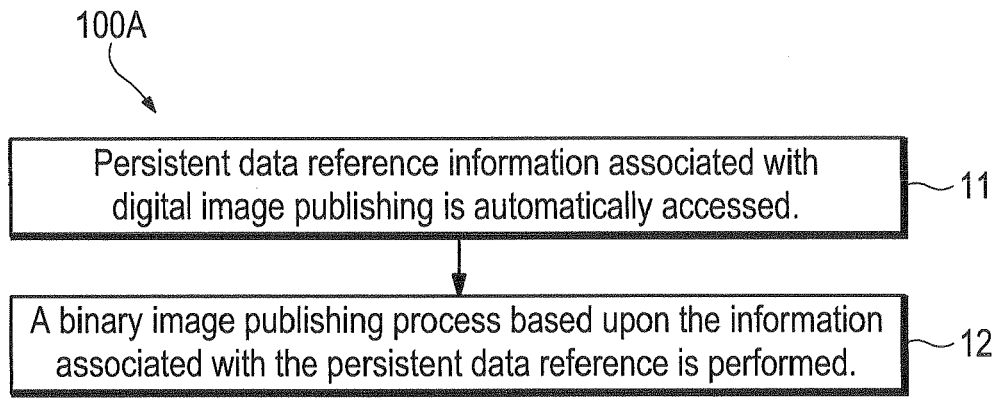
FIG. 1A is a flow chart of a binary image publishing method in accordance with one embodiment of the present invention.

FIG. 1A is a flow chart of binary image publishing method 100A, one embodiment of the present invention. Binary image publishing method 100A facilitates automated publishing management for digital information. In one embodiment of the present invention, binary image publishing method 100A is part of a scaleable and extensible tree based architecture for seamlessly streamlining, integrating and automating publishing of digital information based on a variety of business workflow concerns. In one exemplary implementation binary image publishing method 100A also provides publishing on demand capabilities including compatibility coordination resolution (e.g., software compatibility with other software and/or hardware).

In step 11, persistent data reference information associated with digital image publishing is automatically accessed. The persistent data reference information includes a variety of publishing and workflow management information (e.g., information related to authorization, entitlement, packaging, updating, maintenance, etc.). In one embodiment of the present invention, the persistent data references include software programming object oriented designators (e.g., userID ( ), sw-AuthOID ( ), etc.) and their associated attributes. The persistent data references are tracked and information associated with the persistent data references can be modified. In one exemplary implementation, the automatically accessed persistent data reference information provides an indication whether or not a user has authorization and authority to engage in publication activities. The information associated with the persistent data references can be stored in a variety of databases. In one embodiment the persistent data reference information is configured in XML-based software data models.

In step 12, a binary image publishing process based upon the information associated with the persistent data references is performed. In one exemplary implementation, if the automatically accessed persistent data reference information indicates a user has authorization and authority to engage in publication activities the user can execute publishing services and workflow management processes. The publishing services and workflow management processes permit the user to populate additional information associated with persistent data references (e.g., add attributes, define attributes, etc.). In one exemplary implementation metadata is associated with a binary image in an organized hierarchy that provides scalable and integrated binary image publishing in a flexible and extensible manner.

Figure 1B:
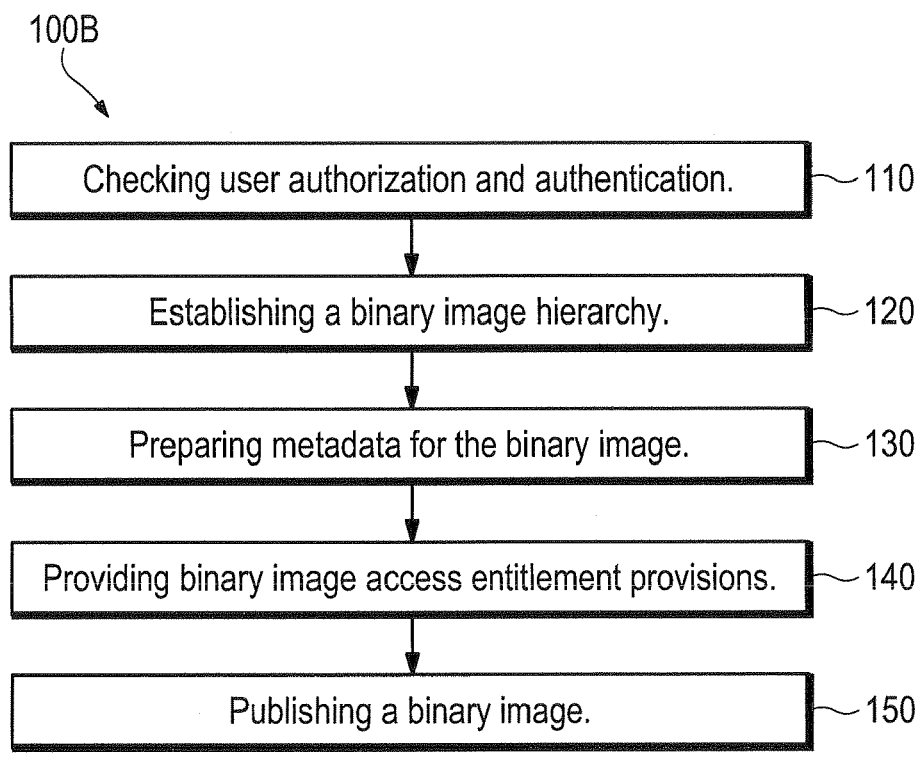
FIG. 1B is a flow chart of binary image publishing method 100B in accordance with another embodiment of the present invention.

FIG. 1B is a flow chart of binary image publishing method 100B. In one embodiment of the present invention binary image publishing process method 100B is utilized to publish a single binary image at a time. For example, it can publish a regular binary image, special binary image, beta image, bug fix, software patch, boot image, etc. Binary image publishing method 100B is capable of handling a variety of publishing activities and related business processes in a flexible and scalable manner. In one embodiment an open workflow model provides flexibility for complex software publishing business processes and XML technology provides scalability and extensibility for a variety of publishing data models.

In step 110, user authentication and authorization is checked. In one embodiment, the present invention model-driven binary image publishing system can be integrated with a variety of different software user authorization systems based on a variety of XML DTD definitions (e.g., database-based or Light-weight Directory Access Protocol (LDAP) based user authorization models, vendor software products like Netegrity or Oblix, etc.). In one exemplary implementation, the user authentication identifies a user based on user authentication entries (e.g., name, password, etc.) and the user authorization is based upon a business role engine and model. If the user authentication and authorization are not validated then the process stops. If the user authentication and authorization are validated the process proceeds to step 120.

At step 120, a binary image hierarchy is established. In one embodiment of the present invention, the binary image hierarchy is established by selecting an existing hierarchy. The present invention model-driven binary image publishing system can be easily integrated with any software information containing different software product hierarchies. For example, a present invention model-driven binary image publishing system can integrated with many software product hierarchies. In one exemplary implementation the XML DTD is defined and the database design is known, and software image metadata info is populated for a variety of product hierarchies. Therefore, the present model-driven software publishing system is not only flexible, but also extensible and scalable as well.

If there is no binary image product hierarchy for a particular image to be published, one is established by preparing an XML Document of its software hierarchy or updating a predefined XML document of software hierarchy. This can be a predefined XML document ready for use. In one exemplary implementation, a user-friendly graphical user interface (GUI) is provided to facilitate generation of the XML document in a convenient manner without requiring the user to have extensive XML knowledge. In one embodiment, the present binary image hierarchy comprises a Software Product Category level (software Category OID defined), a Software Products level (software product OID defined), a Software Versions level (software version OID defined), Software Image meta information level etc (software image OID defined). The software Image meta information can include image name, size, description, location, etc. If a valid and approved software hierarchy can not be established for the image to be published, the process ends. If a valid and approved software hierarchy can be established for the image to be published, the process proceeds to step 130.

The metadata for the binary image is prepared in step 130. The metadata facilitates flexibility and extensibility. In one embodiment of the present invention, the metadata includes information associated with publishing services and publishing workflow management. The publishing services can include single image publishing, multiple image publishing, composite image publishing, bug/patch publishing, CD image publishing, publishing on demand, etc. The workflow management can include file transfer activities, scheduling activities, archival activities, notification activities, audit activities, reporting activities, and logging activities. The metadata can also include product information, authorization information, composite information, compatibility information, entitlement information, bug/patch information, etc.

In step 140 provisions for binary image access entitlement are provided. Applicable access entitlements for an image to be published are selected. The access entitlements are selected from existing software access entitlements including "Public Access", "Registered Access", "Partner Access", "Employee Access", "Special Optical User", "Crypto Access" and "IOS Special Release Access", etc. The access entitlement information is automatically populated when publishing the image. The existing software access entitlements can be altered (e.g., new entitlements created) in a database by preparing a corresponding XML document. The new software access entitlement is made ready for selection during further image publishing.

In one embodiment, the present invention entitlement processes go beyond simple role-based authorization system and includes role/right/access management that is mainly responsible for what a publisher is authorized or allowed to do in the binary image publishing system. After a publisher passes a publishing authorization validation, they actually perform software publishing to populate software image entitlement information for a prospective binary image customer, instead of for the binary image publisher. The present invention handles image-level entitlement when a binary image is published and also is easily integrated with image granular entitlement system. Exemplary implementations of entitlement systems and methods are described in copending patent application entitled "A Granular Entitlement System and Method for Protecting Proprietary Digital Information (filed on Dec. 11, 2002), which is incorporated herein by this reference.

The present publishing system can establish granular access entitlement for software customers. In one exemplary implementation, this provides a foundation for establishing software downloading and ownership entitlements (e.g., software warranty, software contract, software licensing, software trial period, etc.) in a manner that facilitates increased software-related revenues. The present model-driven software publishing system can automatically populate a very complex software granular access entitlement model for publishing binary images. The present binary image entitlement is mainly responsible for permitting or restricting binary image downloading after it is published in a predefined location.

In step 150, a binary image published. In one embodiment, a binary image is "published" or stored in a file location defined by its associated software hierarchy. The publishing or storing can based on an available data transfer protocol (e.g., FTP, SSH, HTTP, etc.). The binary image meta data is also published or stored in a binary image information system based on an XML DTD definition. In one example, a software granular access entitlement system is populated with software image meta entitlement data. A binary image location specification can be utilized to publish the binary image. For example, a publishing system can use a file server (e.g., Unix or NT based) to store and maintain binary images. The present model-driven software publishing system is based on a software product hierarchy, and in one embodiment implements software image storage and location in the following format:

[Software Root Directory] [SW Category OID/ . . . / . . . ] [SW Product OID/ . . . / . . . ] [SW Version OID/ . . . / . . . ] [ . . . ]

Here, the "/ . . . / . . . " means that it will be extended as child-parent tree data structures. Since the image location and path is very sensitive information, the present invention can use machine-readable OID (Object IDs) for more information security. In addition, a present binary image hierarchy-based file directory structure can overcome publishing problems associated with duplicate image issues since each OID can be unique and can include a primary key. Thus, the present system can include an image name with different contents and sizes in different file locations.

The present invention can publish via different open standards and protocols. The present invention model-driven publishing system can support numerous following open data communication protocols to publish software image or images from one host to another, including FTP Protocol (File Transfer Protocol), Secure FTP Protocol, SSH Protocol (Secure Shell), HTTP Protocol (Hype-Text Transfer Protocol), and/or HTTPS Protocol (HTTP over SSL, SSL—Secure Socket Layer), etc. The present invention can also support various XML DTDs including:

.XML DTDS for Software User Authentication and Authorization Models,
.XML DTDS for Software Information Model,
.XML DTDS for Software Composite Model,
.XML DTDS for Software Granular Access Entitlement,
.XML DTDS for Software bug/patch,
.XML DTDS for Software vs Software Compatibility, and Software vs Hardware Compatibility, and/or
.XML DTDS for Software Release/Build.

The present invention is expandable to provide other useful publishing activities (e.g., publishing details can be logged into a publishing database). In one exemplary implementation a publishing notification message is forwarded (e.g., to a system administrator, user, etc.).

In one embodiment of the present invention, if there is a problem in a publishing step, a publishing exception message is provided to let a user know that there is something wrong with the software publishing. Furthermore, a user can add or remove a new business workflow task among the above typical publishing steps (e.g., software publishing alerts, software publishing approval and software publishing escalation event etc.).

Figure 1C:
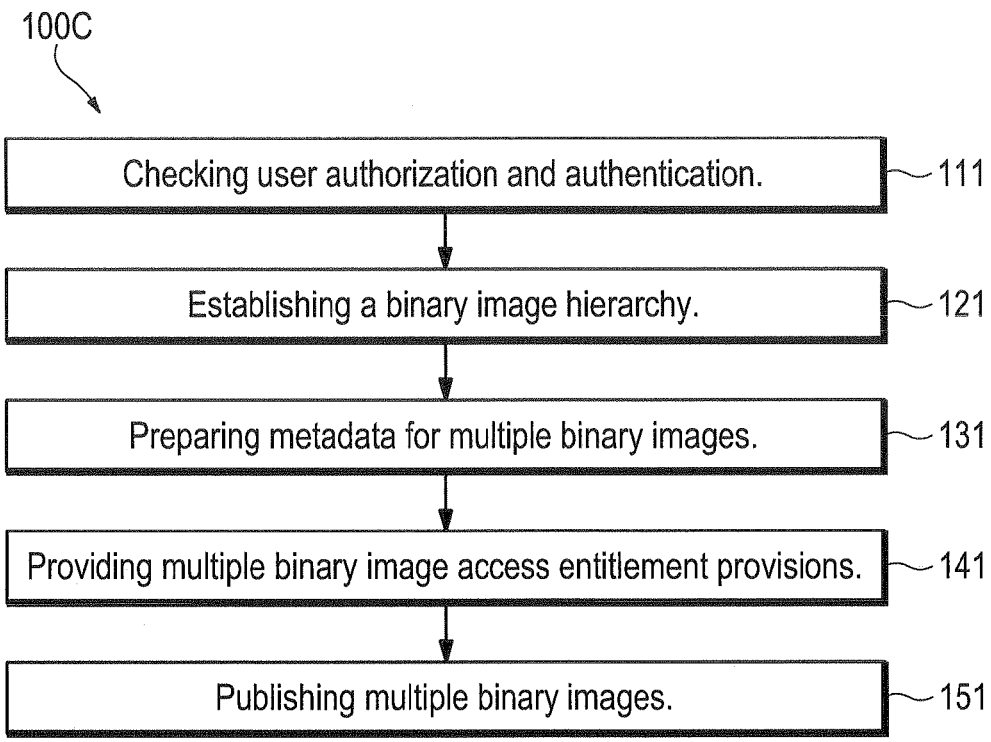
FIG. 1C is a flow chart of a multiple binary image publishing method in accordance with one embodiment of the present invention.

Variations of binary image publishing process method 100B are capable of publishing images in different arrangements. FIG. 1C is a flow chart of multiple binary image publishing process method 100C. This multiple software publishing process is able to publish multiple different image binaries at the same time. Steps 111, and 121 are the same as steps 110 and 120. Step 131, 141 and 151 are similar to steps 130, 140 and 151 except the metadata for multiple binary images is prepared in step 131, provisions for multiple binary image access entitlement are provided in step 141 and multiple binary image publishing is performed in step 151. In step 161 the multiple binary images are published into the same or multiple different locations, and the metadata and entitlement information is populated into different publishing databases. In one embodiment of the present invention, multiple binary image, publishing is accomplished by performing a series of single image publishing processes in a batch mode.

Figure 1D:
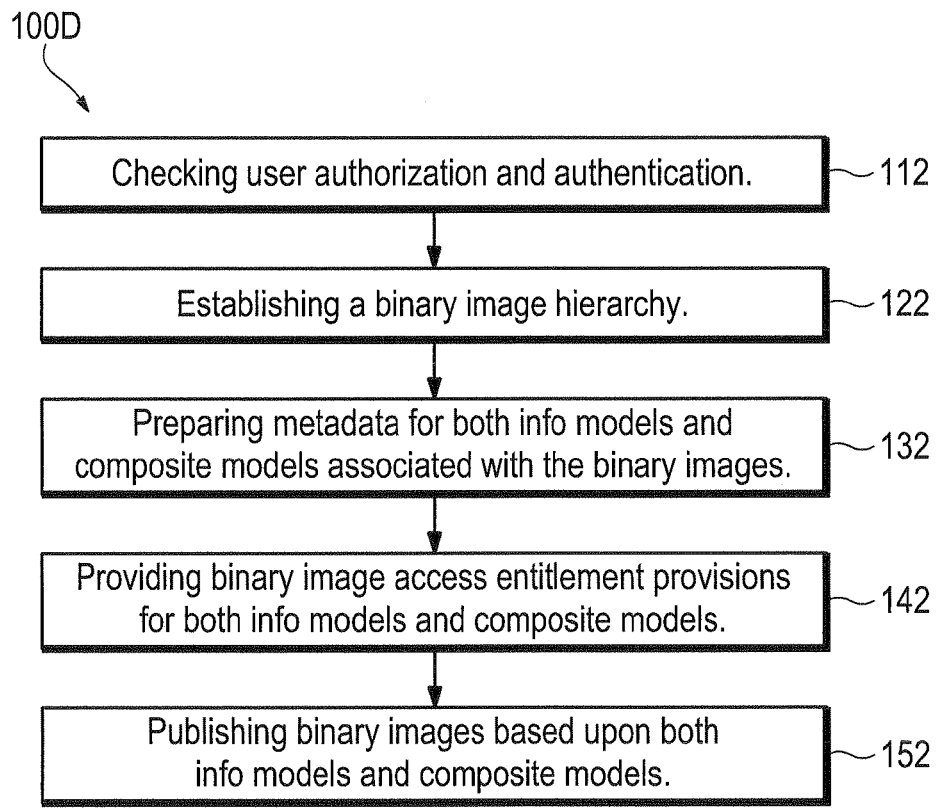
FIG. 1D is a flow chart of a composite binary image publishing method in accordance with one embodiment of the present invention.

FIG. 1D is a flow chart of composite binary image publishing process method 100D. This multiple software publishing process is able to publish multiple different image binaries at the same time. Steps 112, and 122 are the same as steps 110 and 120. Step 132, 142 and 152 are similar to steps 130, 140 and 151 except the metadata for both Software Info Model and Software Composite Model (including multiple software images and their supportive binaries etc) is prepared in step 132, provisions for both Software Info Model and Software Composite Model (including multiple software images and their supportive binaries) binary image access entitlements are provided in step 142 and both Software Info Model and Software Composite Model (including multiple software images and their supportive binaries) image publishing is performed in step 152. In step 152 the multiple binary images are published into the same or multiple different locations, and the metadata and entitlement information is populated into the publishing database. In one embodiment of the present invention a composite publishing process is able to publish multiple integral and bundling-fashion image binaries and their associated supportive binaries altogether via either a single image publishing fashion or a multiple image publishing in a batch mode. This model-driven software composite publishing can be responsible for Software Image Bundling Publishing, Software CD Image Publishing, and Software Promotion Publishing.

The present invention facilitates composite publishing of complex bundling (e.g., various songs on a compact disk) and promotions. For example, CD image publishing can require handling CD image specific features including CD image burning format, file system requirements, etc. In one embodiment, an XML DTD is defined for a CD image system. In addition, the present invention can be coordinated with software product distribution which also deals with promotion, binary image bundling, and distribution. Exemplary composite models are described in copending patent application entitled "A Software Distribution System and Method" (U.S. patent application Ser. No. 09/982,457, filed on Oct. 17, 2001), which is incorporated herein by this reference.

The present invention is capable of integrating with and supporting product (e.g., software) life cycle management activities. In one exemplary implementation, the present invention product publishing system is an integral part of a whole software life cycle management. It can be seamlessly integrated with a product (e.g., software) build/release process. For example, based on a software image file location specification, it uses unique object IDs and software hierarchy approach to handle same image publishing and avoid duplicate image publishing process. By using child-parent data structure for software image or software entity, it can easily integrate with any software build/release including software image nightly build, software image milestone build, software official release build, software CD image build etc.

In accordance with implementations of the present invention (e.g., utilizing XML technology) the present publishing system can be smoothly integrated with a variety of software source control systems based on various types of source software systems (e.g., Rational Clear Case, Concurrent Versions System (CVS), Product Version Control System (PVCS) and Micro Soft (MS) SourceSafe etc.). Thus, this new system can be an integral part of software life cycle management responsible for better software publishing and complex image meta/entitlement data management (e.g., improve software distribution and Software E-Fulfillment/E-Commerce). The present invention binary image publishing process can associate different software builds and releases under a similar software product hierarchy by integrating with a binary image build data model (e.g., nightly build, milestone build, release build, etc.). These different build binary images can be published by following a single, multiple or composite publishing processes.

The present invention is also capable of integrating with other life cycle management activities including bug patch publication. Various binary image products require publication and management of bug and/or patch software. A completely unrelated software data system like Distributed Defect Tracking System (DDTS) based bug system can be integrated with the present publishing system. In addition to handling software bug/patch management, the present invention system and method also associates them together with their regular/official release by using software product hierarchy and image types (e.g., regular image, beta image, crypto image, bug image, patch image, CD image, boot image, supportive image, etc.) when the binary image is published. In one exemplary implementation, the present invention publishing process associates software bug/patch images with their regular/official product releases according to software bug/patch data models. The software bug/patch images can be published by following a single/multiple composite publishing processes.

The present invention can be utilized to realize "Software Image Publish On Demand". In one embodiment, the publishing system has an XML DTD for implementations including software-software and hardware-software compatibility and configuration data models. These data models can be built in the publishing system or be integrated with an external data system (e.g., products responsible for customer's dynamic configurations and also contains software and hardware compatibility). For example, in one embodiment the present invention includes an interface (e.g., an XML interface) for retrieving compatibility and configuration information from other related data systems (e.g., a Product Information Management System (PIMS)). Basic software components are usually published and stored in a software file server by using a single, multiple or composite publishing processes. Since some software customer requests are dynamic in nature (e.g., depend upon software and hardware compatibility or software and software compatibility, etc.) the dynamic publishing process (e.g., "software image publishing on demand") dynamically builds customer special/dynamic requests on the fly based on different software configuration models etc, and then uses runtime software information to publish their corresponding dynamically configured software by performing single/multiple/composite software publishing processes.

The image publishing processes (single, multiple and composite) can be implemented in both web and command-line applications. User-Friendly web GUI interfaces can be provided to perform web-based software publishing processes and tasks with high productivity and efficiency. Command-line APIs can be provided for batch-mode scripts and non-web applications to perform the new model-driven software publishing processes and tasks.

Figure 2:
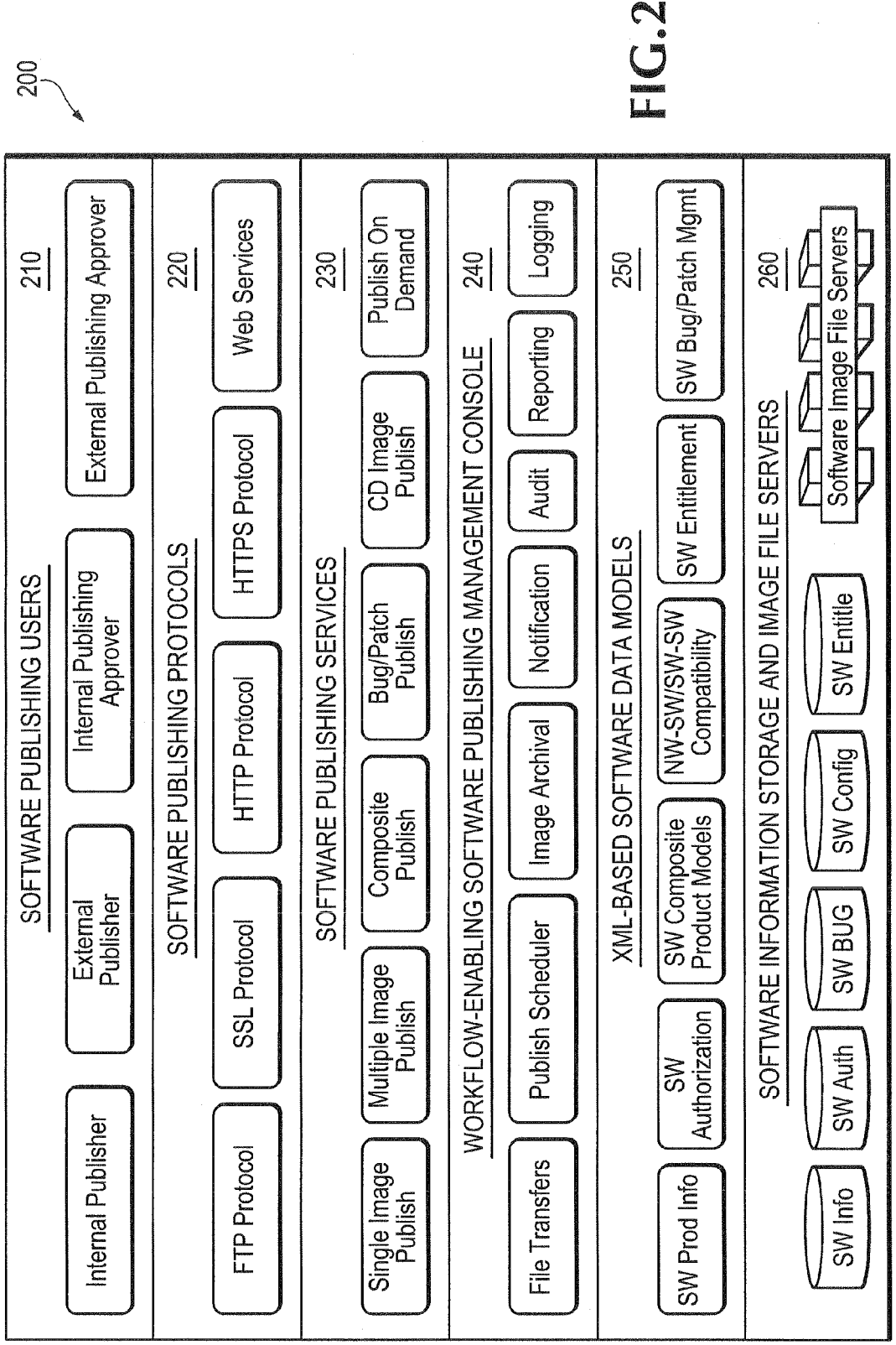
FIG. 2 is a block diagram of a multi-tier publishing architecture for model driven, scalable and integrated software publishing in accordance with one embodiment of the present invention.

The present invention comprises a comprehensive object oriented software architecture that is flexibly adaptable (e.g., extensible, scaleable, etc.) to accommodate numerous features and variations of databases. FIG. 2 is a block diagram of publishing architecture 200 for model driven, scalable and integrated software publishing in accordance with one embodiment of the present invention. It is appreciated that publishing architecture 200 is readily adaptable to other binary image publishing activities (e.g., publishing music, videos, etc.). Publishing architecture 200 is structured in several "layers" or tiers including a user layer 210 (e.g., for confirming user authentication and authorization), a publishing protocol layer 220 (e.g., for establishing a communication protocol), a publishing services layer 230 (e.g., for establishing publishing services), a workflow enabling software publishing management console layer 240 (e.g., for addressing business process issues), an XML-based software data model layer 250 (e.g., for establishing meta data) and a storage layer 260 (e.g., for storing software information metadata in databases and software images in software image file servers). In one exemplary implementation, publishing architecture 200 serves as a guideline to use both of them as open standards to enable different publishing data models seamlessly work together to increase business benefits for binary image publishing.

User layer 210 can include an internal publisher module, an external publisher module, an internal publishing approver module and an external publishing approver module. Publishing protocol layer 220 can include a file transfer protocol (FTP) module, an secure socket layer (SSL) protocol module, a hyper text transfer protocol (HTTP) module, a HTTPS Protocol (HTTP over SSL, SSL—Secure Socket Layer) module, Secure Shell (SSH) module, and a Web services module. Publishing services layer 230 can include a single image publish routine, a multiple image publish routine, a composite publish image routine, a bug/patch publish routine, a CD image publish routine, and a publish on demand routine. Workflow enabling software publishing management console layer 240 can include a file transfer module, a publish scheduler module, an image archival module, a notification module, an audit module, a reporting module, and a logging module. XML-based software data model layer 250 can include a software product information model, a software authorization model, a software composite model, a compatibility model, a software entitlement model, and a software bug/patch model. Storage layer 260 can include a software information module, a software authorization module, a software bug module, a software configuration module, a software entitlement module and software image file server components.

Figure 3A:
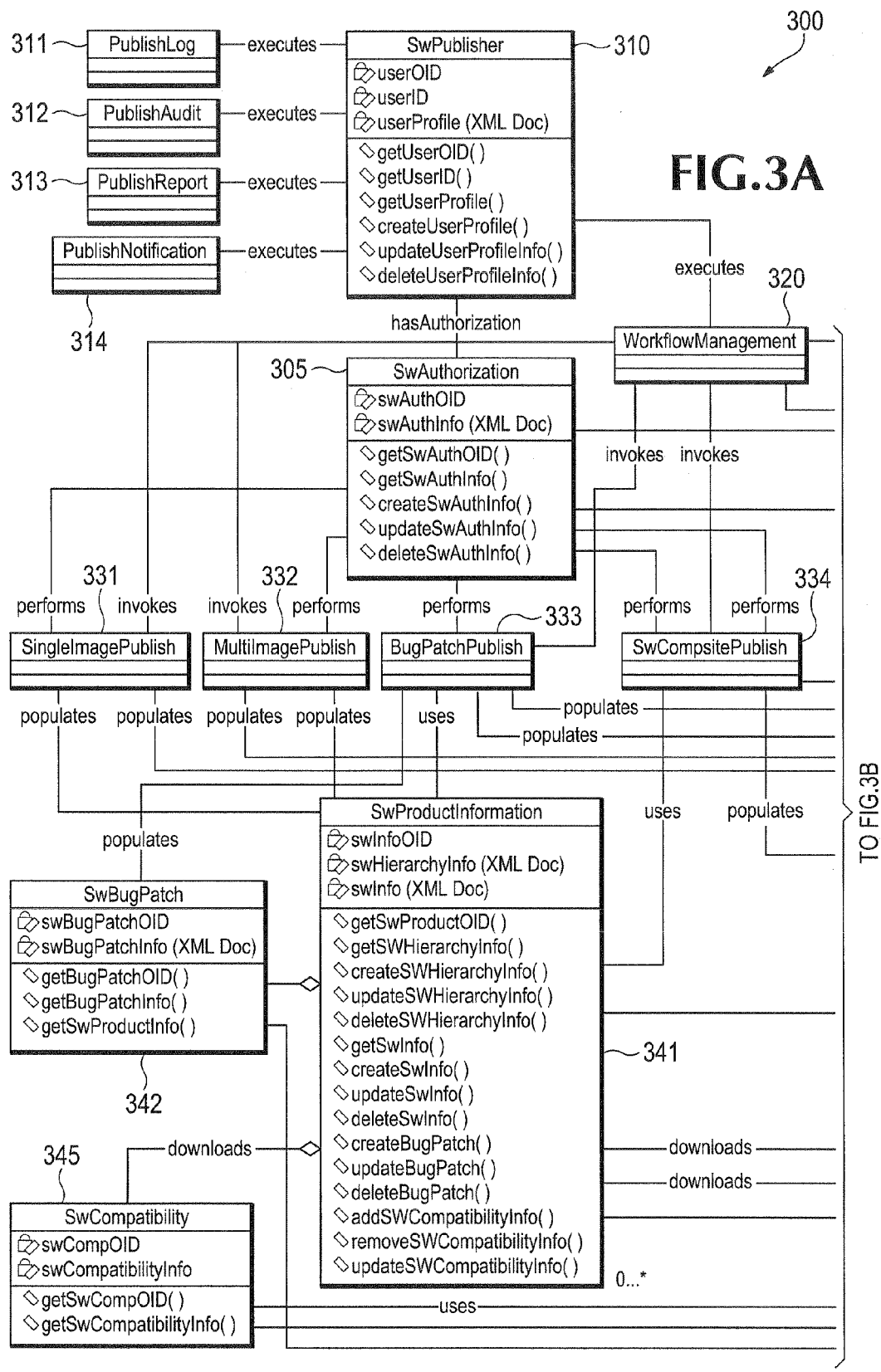
FIGS. 3A and 3B are block diagrams illustrating an object oriented UML model for a model-driven, scalable and integrated software publishing system in accordance with one embodiment of the present invention.
Figure 3B:
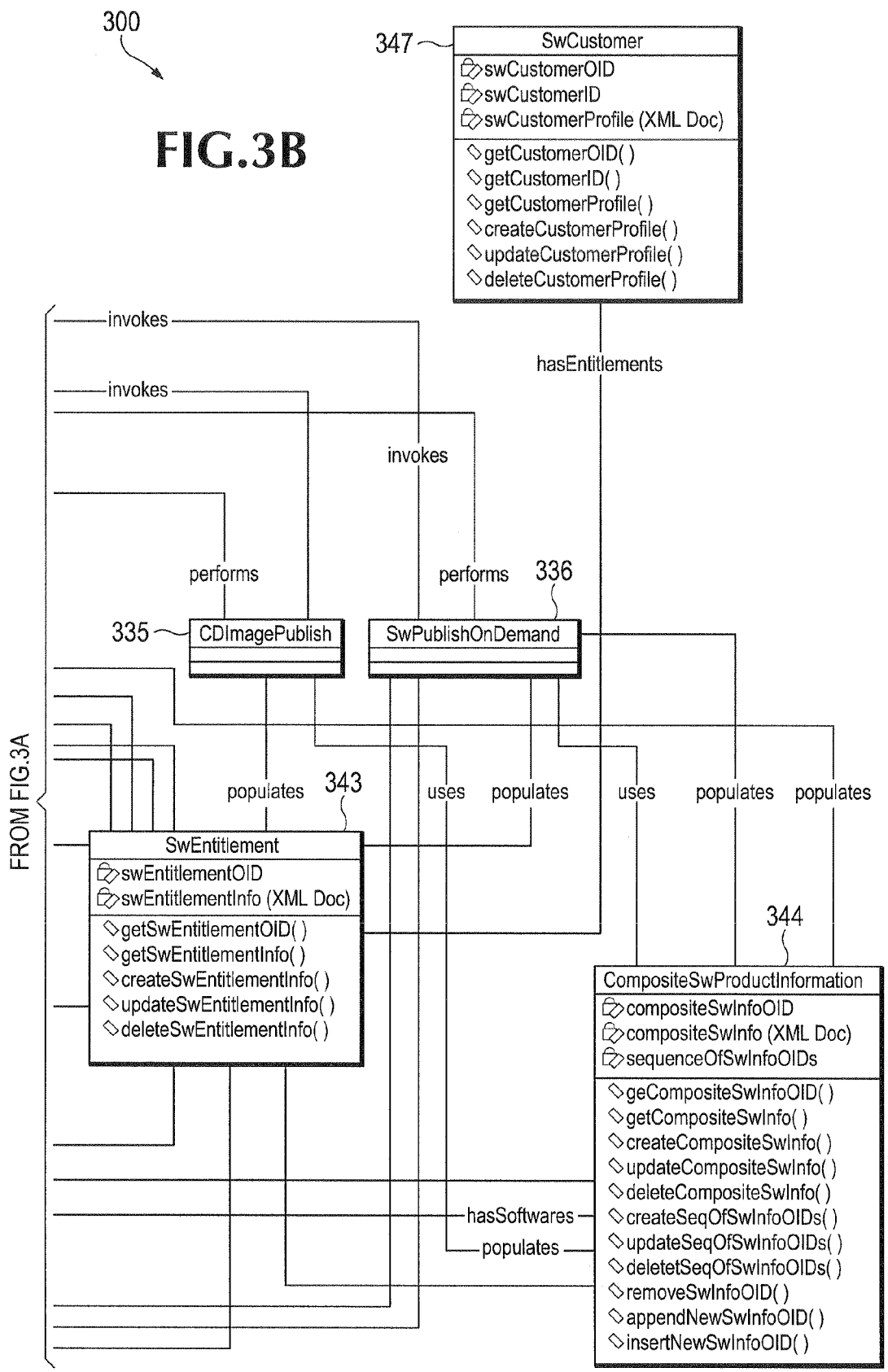

FIGS. 3A and 3B are block diagrams illustrating object oriented UML model 300 for a model-driven, scalable and integrated software publishing system in accordance with one embodiment of the present invention. Each of the modules in object oriented UML model 300 include objects associated with their respective designated purposes. Software authorization 305 controls authorization to software publisher module 310 and permission to perform single image publish module 331, multiple image publish module 332, bug/patch publish module 333, software composite publish module 334, compact disk publish 335 and software publish on demand 336. Software publisher module 310 permits execution of publishing management modules including publishing log module 311, publishing audit module 312, publishing report module 313, publishing notification module 314 and workflow management module 320. Workflow management module 320 invokes single image publish module 331, multiple image publish module 332, bug/patch publish module 333, software composite publish module 334, compact disk publish 335 and software publish on demand 336. Single image publish module 331 populates software product information module 341 and software entitlement module 343. Multiple image publish module 332 populates software product information module 341 and software entitlement module 343. Bug/patch publish module 333 uses software product information module 341 and populates software bug/patch module 342 and software entitlement module 343. Software composite publish module 334 uses software product information module 341 and populates composite software product information module 344 and software entitlement module 343. Compact disk publish 335 uses software product information module 341 and software compatibility module 345 to populate software entitlement module 343 and populates composite software product information 344. Software publish on demand 336 uses software compatibility module 345 and software product information 341 and populates software entitlement module 343 and composite software product information module 344. Software entitlement module 343 provides entitlement indications for software customer module 347.

Figure 4A:
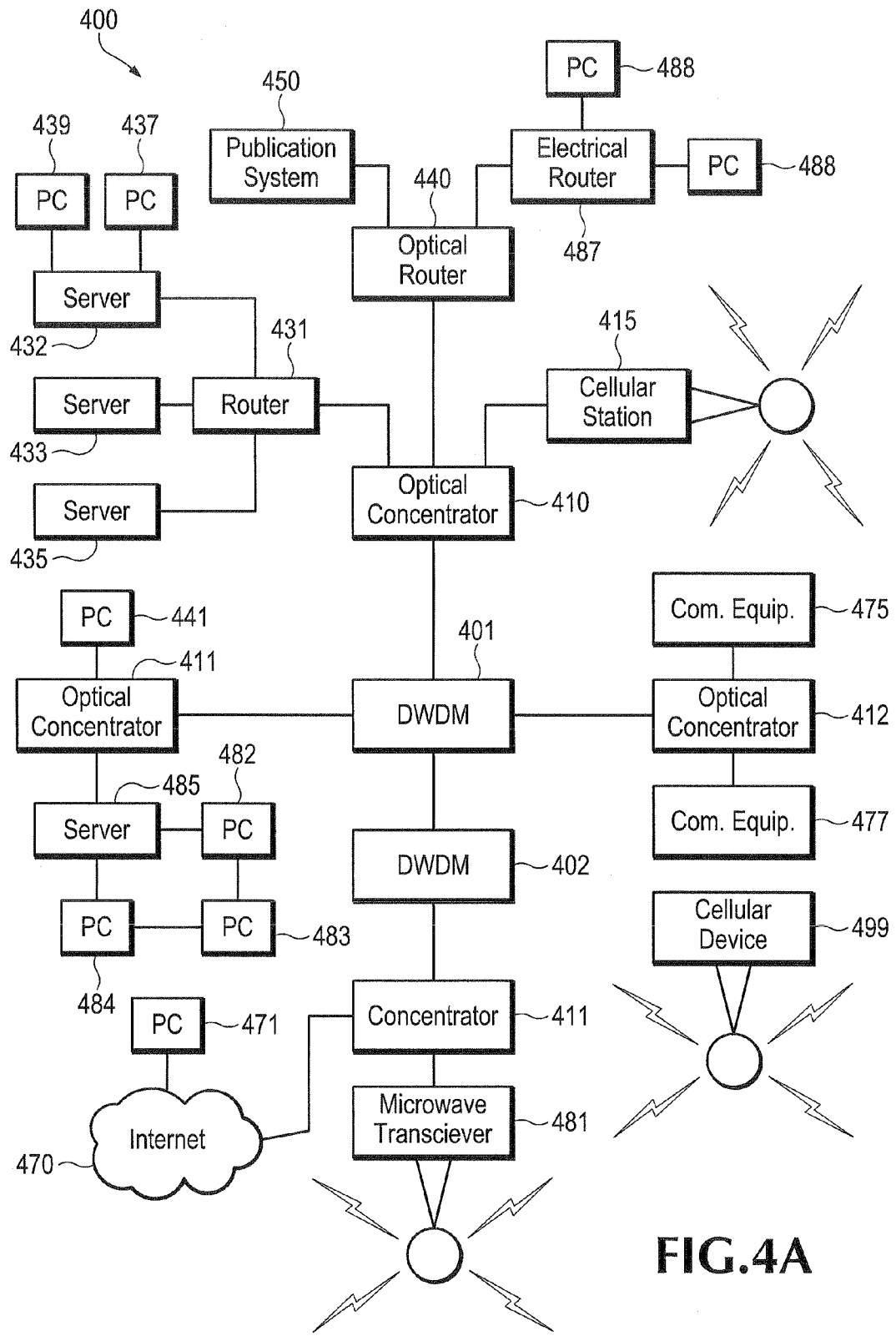
FIG. 4A is block diagram of a communications network utilized to implement one embodiment of the present invention.

In one embodiment, the present invention methods are implemented on devices connected via a communication network. FIG. 4A is a block diagram of communication network 400. In one embodiment of the present invention, binary image publishing methods 100 A, B, C and/or D are implemented via communications network 400. Communication network 400 comprises automated publication system 450, dense wave division multiplexer (DWDM) 401 and 402, optical concentrators 410, 411, 412 and 417, routers 431, 440 and 487, cellular station 415, cellular device (e.g., phone, handheld computer, etc.) 499, microwave transceiver 481, Internet 470, servers 485, 432, 433 and 435, personal computers 437, 439, 441, 471, 482, 483, 484, 488 and 489, and miscellaneous communication equipment 475 and 477. The components of communications network 400 communicate with each other over a variety of architectures utilizing numerous communication protocols. One exemplary implementation of communications network 400 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Figure 4B:
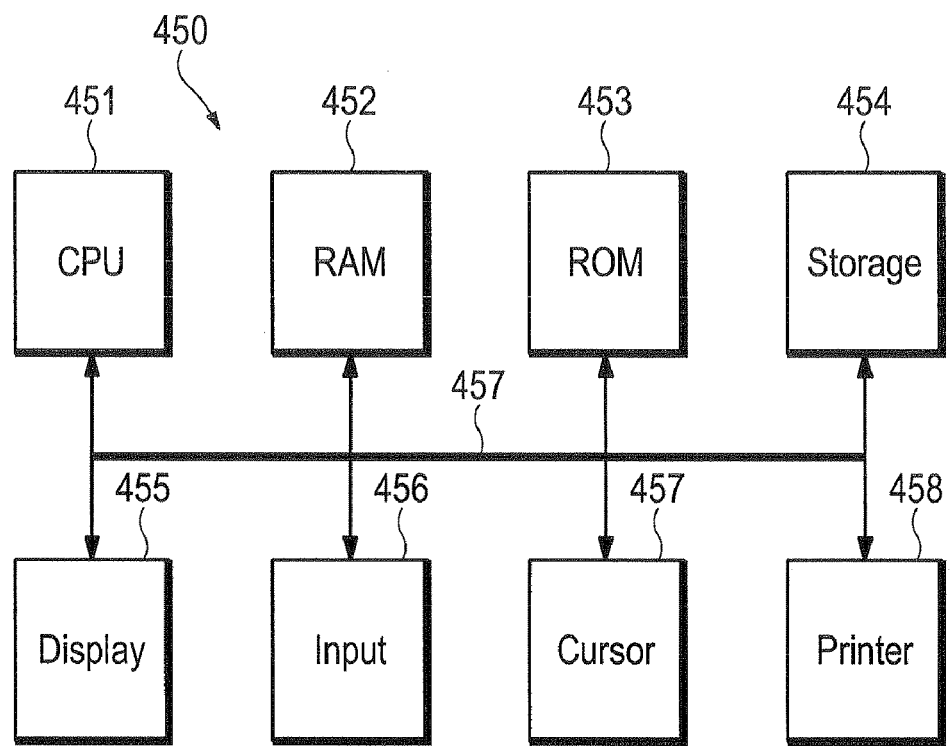
FIG. 4B is a block diagram of an exemplary automated publication system in accordance with one embodiment of the present invention.

FIG. 4B is a block diagram of automated publication system 450, one embodiment of a platform that is utilize to implement binary image publishing method 100 A, B, C, and/or D. In general, automated publication system 450 comprises a bus 457, a central processor 451, a random access memory 452, a read only memory 453, a data storage device 454, a display device 455, an alphanumeric input device 456, a cursor control device 457 and a printer 458. Bus 457 is coupled to central processor 451, random access memory 452, read only memory 453, data storage device 454, display device 455, alphanumeric input device 456, cursor control device 457 and printer 458.

The components of automated publication system 450 cooperatively operate to perform their designated functions. Central processor 451 processes information and instructions including instructions associated with a binary image publishing method (e.g., 100 A, B, C, and/or D). Random access memory 452 stores information and instructions for the central processor 451 including information and instructions associated with method a binary image publishing method. Read only memory 453 stores static information and instructions for the processor 451. Data storage device 454 (e.g., such as a magnetic or optical disk and disk drive) provides bulk storage for storing information and instructions. Display device 455 displays information to a computer user. Alphanumeric input device 456 includes alphanumeric and function keys for communicating information and command selections to the central processor 451. Cursor control device 457 communicates user input information and command selections to the central processor 451. Printer 458 prints documents in accordance with directions from central processor 451. Bus 457 is a path for communicating information and can be communicatively coupled to a communication network (e.g., communication network 400). The components of automate publication system 450 comprise a variety of interchangeable embodiments.

The present invention provides a unique, integrated and comprehensive binary image publishing system and method. In one embodiment, a present invention model-driven binary image publishing system and method comprises a comprehensive variety of software data models including user profile data model, user authorization model, software information model, software composite information, software granular access entitlement, software product hierarchy etc. In addition, it is able to perform different types of software image publishing, including software single image publishing, multiple image publishing and software composite publishing (e.g., software CD and bundling publishing etc.). These different publishing components work together within a model-driven software publishing system and method in atn integrated and unique fashion. In addition, implementation of "Software Image Publishing On Demand" provides a unique mechanism for achieving maximized business benefits for software publishing and software distribution.

The present invention includes an extensible and flexible architecture. The present model-driven software publishing system is implemented based on extensible XML technologies. Therefore, new different XML DTDs can be re-defined for different software models of a software asset management and distribution system, without changing the present software publishing system architecture, XML-based API definitions, etc. Thus, the present software publishing system is implemented based on an extensible and flexible architecture. In addition, the present invention publishing architecture and implementation can make otherwise difficult integration with software bug/patch publishing and software build and release processes very smooth.

The present invention also provides an effective and efficient workflow-enabled publishing system and method. The present model-driven software publishing system uses workflow models to effectively and flexibly handle and manage different complex software publishing processes. Present invention smooth business publishing processes are designed to handle very complex publishing workflow tasks (e.g., publishing alert, publishing notification, publishing approving event, etc.) with ease.

The present invention is integratable with critical software product hierarchies which play a central and critical role in the present model-driven software publishing system. It is capable of determining whether or not it is appropriate to proceed with a specific software publishing process. If software product hierachy is not valid and approved (with official software product names, vocabularies, etc.), the present new software publishing system will not allow software publishing to proceed. This lays down a foundation for software or software-related companies to build a scalable software publishing architecture and then seamlessly integrate with their software distribution systems etc.

The present model-driven software publishing system can be implemented based on a variety of workflow software products and XML technology to smoothly integrate with a complex software granular access entitlement database model. This facilitates prevention of software-related revenue leaking. At the same time other activities including individual-based software ownership entitlements (e.g., software warranty, software contract, software licensing, etc.) that depend upon software customers' activities (e.g., software purchase, software licensing request, etc.) do not interfere with software publishing activities.

The present invention also facilitates resolution of duplicate image issues. Since software object IDs (OID) can be unique to a software data management system, this model-driven software publishing system is capable of resolving duplicate image publishing issues in accordance with software a OID based image location specification. Thus, it facilitates performance of software publishing for same image names with different contents at different locations.

The present invention also facilitates avoidance of extensive file directory permission management. The present model-driven software publishing system uses both workflow model and XML technology to integrate with very complex user role authorization and software entitlements with increased flexibility and scalability and thus avoids extensive file directory permission management. It also addresses various business needs and provide numerous business benefits. For example, the present invention assists increased productivity and efficiency in software publishing business processes and management via Internet technology. It helps streamline and automate software publishing and distribution for better customer satisfaction.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method comprising:
  accessing publishing-based user information, associated with a publisher, in a memory device, where the publisher is a user of a electronic publishing system to publish software images for prospective software image customers;

determining the publisher is authenticated and authorized to perform publishing-related activities according to the publishing-based user information, where publishing-related activities enable the publisher to electronically publish one or more software images and to determine whether to provide one or more prospective software image customers access to the published software images associated with the publisher;

generating metadata for the software image including software image entitlement information associated with prospective software image customer, where the software image entitlement information to indicate any restrictions on the prospective software image customer from accessing published software images by the publisher;

publishing said software image and the metadata when the publisher is authenticated and authorized to perform publishing-related activities, where access to the published software image is dictated by the software image entitlement information;

generating patch information associated with at least one software patch to fix a problem corresponding to the published software image, where the patch information is included with the metadata for the software image; and publishing the software patch corresponding to the published software image when the publisher is authenticated and authorized to perform publishing-related activities, where the patch information in the metadata of the published software image associates the software patch with the corresponding software image.

2. A method of claim 1 wherein said software image is stored in a file location defined by a software image hierarchy.

3. A method of claim 2 wherein said software image hierarchy is established by selecting an existing hierarchy.

4. A method of claim 2 wherein an extensible markup language document type definition (XML DTD) is defined and software image metadata information is populated for software image hierarchies associated with a variety of products.

5. A method of claim 2 wherein said software image hierarchy comprises a software product category level, a software products level, a software versions level, and a software image meta information level.

6. A method of claim 1 wherein a user authentication is based on user authentication entries and user authorization is based upon on information in a business role engine model.

7. A method of claim 1 wherein said metadata includes information associated with publishing services and publishing workflow management.

8. A method of claim 1 wherein the software image entitlement information specifies restriction of access by the prospective software image customer to the software images on a per software image basis.

9. A method of claim 1 further comprising providing a foundation for establishing downloading and ownership entitlements, where the ownership entitlements include at least one of warranty information or software licensing information.

10. A method of claim 1 wherein said publishing is based on an available data transfer protocol which specifies a location in a file server for said software image storage and said metadata is stored in a software image information database system based on an extensible markup language document type definition (XML DTD).

11. A method of claim 1 further comprising publishing an exception message to notify the publisher that there is a problem associated with the electronic publishing of the software image.

12. A method of claim 1 further comprising:
receiving compatibility information for software or hardware utilized by at least one of the software image customers;
automatically reconfiguring the published software image according to the compatibility information responsive to a dynamic request from the software image customer; and
publishing the reconfigured software image responsive to the dynamic request from the software image customer.

13. A system comprising:
a bus for communicating information associated with software image publishing;
a memory, coupled to the bus, for storing said information associated with a software image publishing; and
a processor, when processing said information associated with software image publishing received from the memory, is adapted to:
access publishing-based user information, associated with a publisher, in a memory device, where the publisher is a user of a electronic publishing system to publish software images for prospective software image customers;
determine the publisher is authenticated and authorized to perform publishing-related activities according to the publishing-based user information, where publishing-related activities enable the publisher to electronically publish one or more software images and to determine whether to provide one or more prospective software image customers access to the published software images associated with the publisher;
generate metadata for the software image including software image entitlement information associated with the prospective software image customer, where the software image entitlement information to indicate any restrictions on the prospective software image customer from accessing published software images by the publisher;
publish said software image and the metadata when the publisher is authenticated and authorized to perform publishing-related activities, where access to the published software image is dictated by the software image entitle information;
generate patch information associated with at least one software patch to fix a problem corresponding to the published software image, where the patch information is included with the metadata for the software image; and
publish the software patch corresponding to the software image when the publisher is authenticated and authorized to perform publishing-related activities, where the patch information in the metadata of the software image associates the software patch with the corresponding software image.

14. A system of claim 13 further comprising an interface to receive compatibility information for software or hardware utilized by at least one of the software image customers, wherein the processor, responsive to a dynamic request from the software image customer, is adapted to automatic reconfigure the published software image according to the compatibility information and publish the reconfigured software image.

15. A system of claim 14 wherein the processor is further adapted to issue an exception message to notify the publisher that there is a problem associated with the publishing of the software image.

16. A system of claim 13 wherein said bus is communicatively coupled to a communication network.

17. A system comprising means for accessing publishing-based user information, associated with a publisher, in a memory device, where the publisher is a user of a electronic publishing system to publish software images for prospective software image customers; means for determining the publisher is authenticated and authorized to perform publishing-related activities according to the publishing-based user information, where publishing-related activities enable the publisher to electronically publish one or more software images and to determine whether to provide one or more prospective software image customers access to the published software images associated with the publisher;

means for generating metadata corresponding to a software program, the metadata including software program entitlement information associated with at least prospective software program customer, where the software program entitlement information to indicate any restrictions on the prospective software program customer from accessing the software program when published;

means for publishing the software program, where access to the published software program is controlled by the software program entitle information;

means for generating patch information associated with at least one software patch to fix a problem corresponding to the published software program, where the patch information is included in the metadata for the software program; and electronically publishing the software patch corresponding to the published software program, where the patch information in the metadata of the published software program associates the software patch with the corresponding software program.

18. The system of claim 17 further comprising means for providing a foundation for establishing downloading and ownership entitlements, where the ownership entitlements includes at least one of warranty information or software licensing information.

19. The system of claim 17 further comprising means for publishing an exception message to publish a notification when there is a problem associated with the publishing of the software program.

20. The system of claim 17 further comprising:

means for receiving compatibility information for software or hardware utilized by at least one of the software program customers;

means for automatically reconfiguring the published software program according to the compatibility information responsive to a dynamic request from the software program customer; and means for publishing the reconfigured software program responsive to the dynamic request from the software program customer.

21. The system of claim 17 wherein the metadata includes information associated with publishing services and publishing workflow management.

* * * * *

UNITED STATES PATENT AND TRADEMARK OFFICE
CERTIFICATE OF CORRECTION

PATENT NO.         : 7,506,244 B1
APPLICATION NO.    : 10/360462
DATED              : March 17, 2009
INVENTOR(S)        : Johnson Jiahui Qin It is certified that error appears in the above-identified patent and that said Letters Patent is hereby corrected as shown below:

At first page, column 2, line 17, please delete "is" and insert -- be --.

At column 14, line 48, please delete "entitle" and insert -- entitlement --.

Signed and Sealed this

Twenty-second Day of December, 2009

David J. Kappos
*Director of the United States Patent and Trademark Office*